US012654728B2

(12) United States Patent
Hu et al.

(10) Patent No.: US 12,654,728 B2
(45) Date of Patent: Jun. 16, 2026

(54) METHOD AND APPARATUS FOR INDICATING VEHICLE STATE INFORMATION

(71) Applicant: Yinwang Intelligent Technologies Co., Ltd., Shenzhen (CN)

(72) Inventors: Wenxiao Hu, Shenzhen (CN); Xin Guan, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 49 days.

(21) Appl. No.: 18/602,864

(22) Filed: Mar. 12, 2024

(65) Prior Publication Data

US 2024/0217536 A1     Jul. 4, 2024

Related U.S. Application Data

(63) Continuation of application No. PCT/CN2021/117888, filed on Sep. 13, 2021.

(51) Int. Cl.
B60W 50/14          (2020.01)

(52) U.S. Cl.
CPC ....... B60W 50/14 (2013.01); B60W 2050/146 (2013.01); B60W 2530/00 (2013.01)

(58) Field of Classification Search
CPC ........... B60W 50/14; B60W 2050/146; B60W 2530/00; G08G 1/00; B60Q 9/00
USPC ......................................................... 701/36
See application file for complete search history.

(56) References Cited

U.S. PATENT DOCUMENTS

| | | | | |
|---|---|---|---|---|
| 11,351,989 | B2 * | 6/2022 | Yoo | B60W 50/14 |
| 2010/0102945 | A1 * | 4/2010 | Watson | B60L 50/16 |
| | | | | 340/462 |
| 2018/0079306 | A1 | 3/2018 | Kim et al. | |
| 2020/0244897 | A1 * | 7/2020 | Yamamoto | B60R 1/27 |
| 2021/0146962 | A1 * | 5/2021 | Kaji | B60W 30/17 |
| 2021/0347371 | A1 * | 11/2021 | Lee | B60W 60/0053 |
| 2023/0221569 | A1 * | 7/2023 | Ohyama | B60K 35/235 |
| | | | | 701/523 |
| 2024/0012603 | A1 * | 1/2024 | Yoshida | G06F 3/1446 |

FOREIGN PATENT DOCUMENTS

| | | | | |
|---|---|---|---|---|
| CN | 107985077 A | 5/2018 | | |
| CN | 111993889 A | 11/2020 | | |
| DE | 102019208763 A1 | 12/2020 | | |
| EP | 3552908 A2 * | 10/2019 | | B60W 50/14 |
| JP | 2000357300 A | 12/2000 | | |
| WO | WO-2005080139 A1 * | 9/2005 | | B60K 35/81 |

* cited by examiner

*Primary Examiner* — Tuan C To
(74) *Attorney, Agent, or Firm* — Leydig, Voit & Mayer, Ltd.

(57) ABSTRACT

This disclosure provides a method and an apparatus for indicating vehicle state information. The method includes: A controller obtains state information that needs to be indicated currently and state information that is being indicated. The state information includes a state type and state priority information. The controller determines a state indication strategy based on the state information that needs to be indicated currently and the state information that is being indicated. The state indication strategy includes a strategy of indicating the state information that needs to be indicated currently.

18 Claims, 5 Drawing Sheets

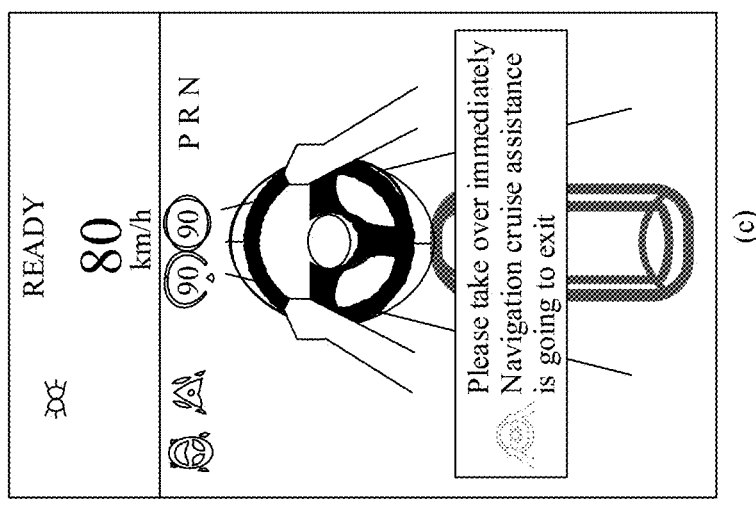
(c)
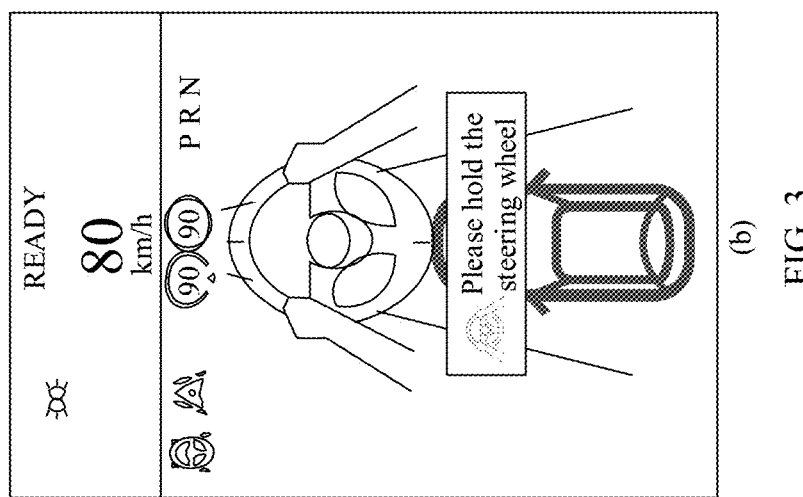
(b)
FIG. 3
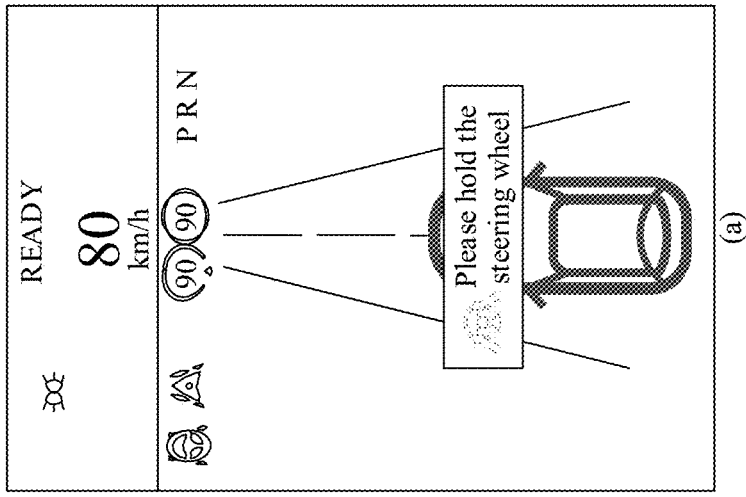
(a)

METHOD AND APPARATUS FOR INDICATING VEHICLE STATE INFORMATION

CROSS-REFERENCE TO RELATED APPLICATIONS

This is a continuation of International Application No. PCT/CN2021/117888, filed on Sep. 13, 2021, the disclosure of which is hereby incorporated by reference in its entirety.

TECHNICAL FIELD

This disclosure relates to the field of vehicles, furthermore, to a method and an apparatus for indicating vehicle state information.

BACKGROUND

To ensure safe driving, state information of a driving vehicle needs to be fed back to a driver in a timely manner. For example, a dashboard is used to indicate a state of the driving vehicle to the driver in a form of visual information, for example, remaining power of the vehicle and whether a door of the vehicle is closed. An existing vehicle state information indication is usually a mechanized indication based on a conventional entire vehicle function and state. In this indication manner, it cannot be ensured that a state that needs to be processed urgently is indicated to a user in a timely manner, and it cannot be ensured that the user can clearly learn of an operation that needs to be performed based on state information. For example, a fixed term is used to indicate information about a fault of a part of the vehicle to the user.

With popularization of driving assistant technologies and autonomous driving, state information in the vehicle becomes complex and diversified. Therefore, there is an urgent need for a method for indicating a vehicle state, to indicate the state information of the vehicle to the user in a timely manner.

SUMMARY

This disclosure provides a method and an apparatus for indicating vehicle state information, to indicate current state information of a vehicle to a user in a timely manner.

According to a first aspect, a method for indicating vehicle state information is provided. The method includes: A controller obtains state information that needs to be indicated currently and state information that is being indicated. The state information includes a state type and state priority information. The controller determines a state indication strategy based on the state information that needs to be indicated currently and the state information that is being indicated. The state indication strategy includes a strategy of indicating the state information that needs to be indicated currently.

According to the method provided in this embodiment of this disclosure, the controller may determine, by determining a state that needs to be indicated currently and a state type and/or priority information that are/is being indicated, to indicate a strategy of indicating information that needs to be indicated currently to a user, so that the user can learn of state information of a vehicle in a timely manner, thereby ensuring safe driving.

With reference to the first aspect, in some embodiments of the first aspect, the state type includes a timing state, and the timing state includes at least one of the following states: a fault-type state, a state in which a driving assistance function partially or completely exits, a state in which the driving assistance function is actively or passively degraded, and a notification-type state.

With reference to the first aspect, in some embodiments of the first aspect, the state type further includes a persistence state, the persistence state is used to indicate the user to perform a corresponding operation, and priority information of the persistence state is determined based on time when the user starts to perform the corresponding operation.

With reference to the first aspect, in some embodiments of the first aspect, that the controller determines a state indication strategy based on the state information that needs to be indicated currently and the state information that is being indicated includes: The controller determines that a state that needs to be indicated currently is the timing state, and a state that is being indicated currently includes the timing state. The controller determines the state indication strategy based on priority information of the state that needs to be indicated currently and the state that is being indicated currently. Priority information of the timing state is determined based on an emergency degree of the corresponding operation that needs to be performed by the user.

With reference to the first aspect, in some embodiments of the first aspect, that the controller determines the state indication strategy based on priority information of the state that needs to be indicated currently and the state that is being indicated currently includes: If the controller determines that a priority of the state that needs to be indicated currently is higher than a priority of the state that is being indicated currently, the controller determines that the state that needs to be indicated currently interrupts the state that is being indicated currently; or if the controller determines that a priority of the state that needs to be indicated currently is lower than a priority of the state that is being indicated currently, the controller determines not to indicate the state that needs to be indicated currently.

With reference to the first aspect, in some embodiments of the first aspect, that the controller determines the state indication strategy based on priority information of the state that needs to be indicated currently and the state that is being indicated currently includes: If a priority of the state that is being indicated currently is the same as a priority of the state that needs to be indicated currently, the controller determines to interrupt the state that is being indicated currently; or the controller determines to indicate, after a first time period, the state that needs to be indicated currently, where duration of the first time period is not less than remaining indication duration of the state that is being indicated.

With reference to the first aspect, in some embodiments of the first aspect, that the controller determines a state indication strategy based on the state information that needs to be indicated currently and the state information that is being indicated includes: The controller determines that a state that needs to be indicated currently is the persistence state, and that a state that is being indicated currently is the timing state; and the controller determines to indicate, after a first time period, the state that needs to be indicated currently, where duration of the first time period is not less than remaining indication duration of the state that is being indicated.

With reference to the first aspect, in some embodiments of the first aspect, that the controller determines a state indication strategy based on the state information that needs to be indicated currently and the state information that is being indicated includes: The controller determines that a state that needs to be indicated currently is the timing state, and a state that is being indicated currently includes the persistence state; and the controller determines that the state that needs to be indicated currently interrupts or covers the state that is being indicated currently.

With reference to the first aspect, in some embodiments of the first aspect, the controller indicates, to the user according to the state indication strategy, the state that needs to be indicated currently.

With reference to the first aspect, in some embodiments of the first aspect, the controller determines to indicate, to the user in a form of a pop-up window, the state that needs to be indicated currently, where a display location and a format of the pop-up window are fixed, the format of the pop-up window includes an icon and copywriting that are separately arranged on left and right, the copywriting includes state indication copywriting and copywriting of an action that needs to be performed, and the two types of copywriting are set in different lines.

With reference to the first aspect, in some embodiments of the first aspect, the controller determines to indicate, to the user in a form of a combination of the pop-up window and at least one of the following forms, the state that needs to be indicated currently: a sound effect, a text to speech (TTS) voice broadcast, head-up display (HUD), vibration, and a light effect.

According to a second aspect, an apparatus for indicating vehicle state information is provided. The apparatus includes a processing unit, configured to obtain state information that needs to be indicated currently and state information that is being indicated, where the state information includes a state type and state priority information. The processor is further configured to determine a state indication strategy based on the state information that needs to be indicated currently and the state information that is being indicated, where the state indication strategy includes a strategy of indicating the state information that needs to be indicated currently.

According to the apparatus provided in this embodiment of this disclosure, by determining a state that needs to be indicated currently and a state type and/or priority information that are/is being indicated, a strategy of information that needs to be indicated currently is determined to be indicated to a user, so that the user can learn of state information of a vehicle in a timely manner, thereby ensuring safe driving.

With reference to the second aspect, in some embodiments of the second aspect, the state type includes a timing state, and the timing state includes at least one of the following states: a fault-type state, a state in which a driving assistance function partially or completely exits, a state in which the driving assistance function is actively or passively degraded, and a notification-type state.

With reference to the second aspect, in some embodiments of the second aspect, the state type further includes a persistence state, the persistence state is used to indicate the user to perform a corresponding operation, and priority information of the persistence state is determined based on time when the user starts to perform the corresponding operation.

With reference to the second aspect, in some embodiments of the second aspect, the processing unit is configured to determine that a state that needs to be indicated currently is the timing state, and a state that is being indicated currently includes the timing state. The controller determines the state indication strategy based on priority information of the state that needs to be indicated currently and the state that is being indicated currently, where priority information of the timing state is determined based on an emergency degree of the corresponding operation that needs to be performed by the user.

With reference to the second aspect, in some embodiments of the second aspect, if the controller determines that a priority of the state that needs to be indicated currently is higher than a priority of the state that is being indicated currently, the processing unit is configured to determine that the state that needs to be indicated currently interrupts the state that is being indicated currently; or if the controller determines that a priority of the state that needs to be indicated currently is lower than a priority of the state that is being indicated currently, the processing unit is configured to determine not to indicate the state that needs to be indicated currently.

With reference to the second aspect, in some embodiments of the second aspect, if a priority of the state that is being indicated currently is the same as a priority of the state that needs to be indicated currently, the processing unit is configured to determine to interrupt the state that is being indicated currently; or the controller determines to indicate, after a first time period, the state that needs to be indicated currently, where duration of the first time period is not less than remaining indication duration of the state that is being indicated.

With reference to the second aspect, in some embodiments of the second aspect, the processing unit is configured to: determine that a state that needs to be indicated currently is the persistence state, and a state that is being indicated currently is the timing state; and determine to indicate, after a first time period, the state that needs to be indicated currently, where duration of the first time period is not less than remaining indication duration of the state that is being indicated.

With reference to the second aspect, in some embodiments of the second aspect, the processing unit is configured to: determine that a state that needs to be indicated currently is the timing state, and a state that is being indicated currently includes the persistence state, and determine that the state that needs to be indicated currently interrupts or covers the state that is being indicated currently.

With reference to the second aspect, in some embodiments of the second aspect, the processing unit is configured to indicate, to the user according to the state indication strategy, the state that needs to be indicated currently.

With reference to the second aspect, in some embodiments of the second aspect, the processing unit is configured to determine to indicate, to the user in a form of a pop-up window, the state that needs to be indicated currently, where a display location and a format of the pop-up window are fixed, the format of the pop-up window includes an icon and copywriting that are separately arranged on left and right, the copywriting includes state indication copywriting and copywriting of an action that needs to be performed, and the two types of copywriting are set in different lines.

With reference to the second aspect, in some embodiments of the second aspect, the processing unit is configured to determine to indicate, to the user in a form of a combination of the pop-up window and at least one of the following forms, the state that needs to be indicated currently: a sound effect, a text to speech (TTS) voice broadcast, head-up display (HUD), vibration, and a light effect.

According to a third aspect, an apparatus for indicating vehicle state information is provided, including a memory and a processor. The memory stores computer program instructions, and the processor runs the computer program instructions to implement the method according to any one of the first aspect or the embodiments of the first aspect.

According to a fourth aspect, a vehicle is provided, including a memory and a processor. The memory stores computer program instructions, and the processor runs the computer program instructions to implement the method according to any one of the first aspect or the embodiments of the first aspect.

According to a fifth aspect, an apparatus for indicating vehicle state information is provided, including a processor and an interface circuit. The processor is coupled to a memory through the interface circuit, and the processor is configured to execute program code in the memory to implement the method according to any one of the first aspect or the embodiments of the first aspect.

According to a sixth aspect, a computer-readable storage medium is provided, including computer instructions. When the computer instructions are run by a processor, a vehicle control apparatus is enabled to implement the method according to any one of the first aspect or the embodiments of the first aspect.

According to a seventh aspect, a computer program product is provided. When the computer program product runs on a processor, a vehicle control apparatus is enabled to implement the method according to any one of the first aspect or the embodiments of the first aspect.

BRIEF DESCRIPTION OF DRAWINGS

FIG. 3 is a schematic diagram of an interface for indicating vehicle state information according to an embodiment of this disclosure;

DESCRIPTION OF EMBODIMENTS

The following describes technical solutions of this disclosure with reference to the accompanying drawings.

Figure 1:
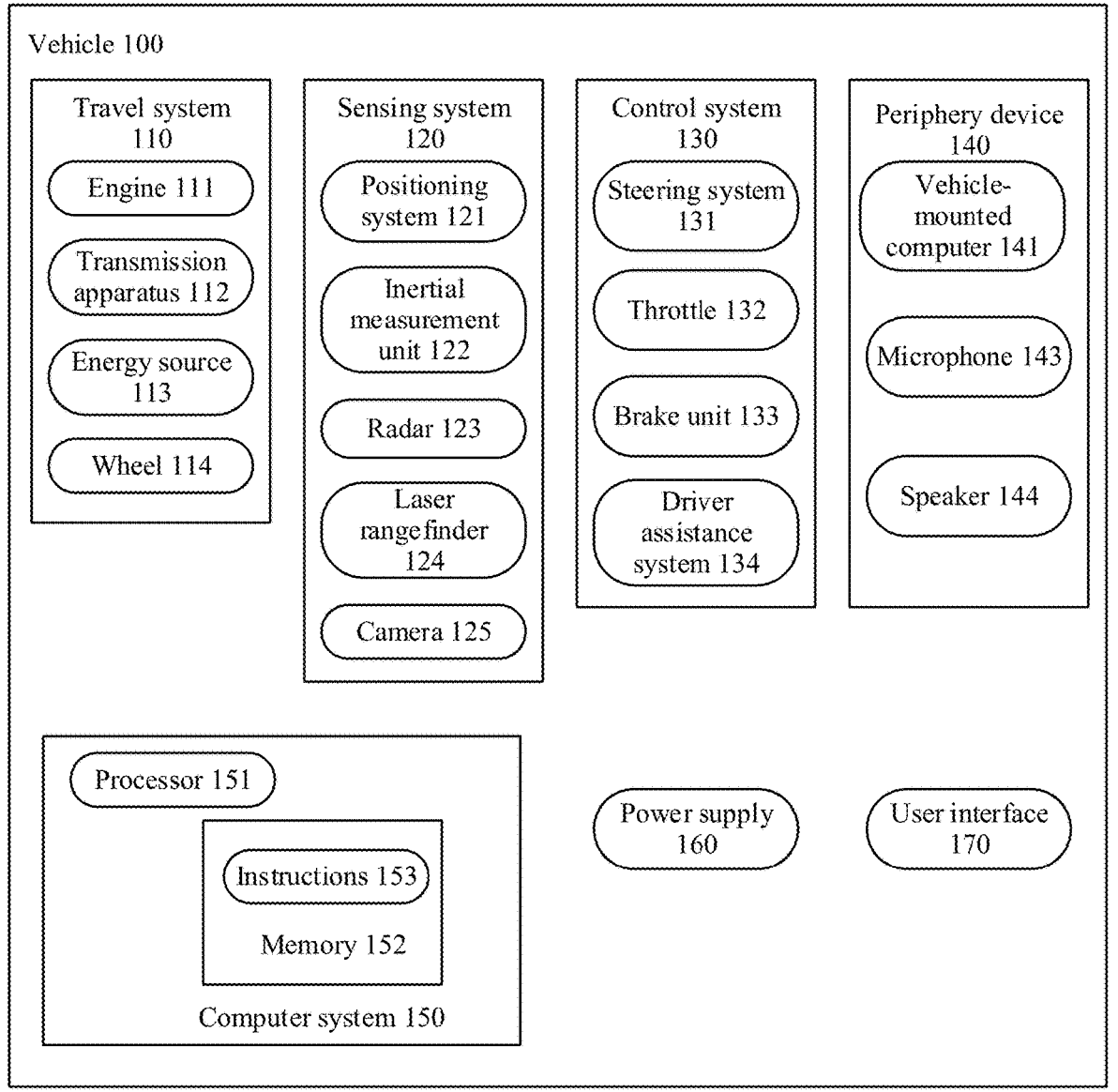
FIG. 1 is a functional block diagram of a vehicle according to an embodiment of this disclosure.

FIG. 1 is a functional block diagram of a vehicle 100 according to an embodiment of this disclosure. The vehicle 100 may be a manually driven vehicle, or the vehicle 100 may be configured in a fully or partially autonomous driving mode.

The vehicle 100 may include various subsystems, for example, a travel system 110, a sensing system 120, a control system 130, one or more peripheral devices 140, a computer system 150, a power supply 160, and a user interface 170.

In some embodiments, the vehicle 100 may include more or fewer subsystems, and each subsystem may include a plurality of elements. In addition, each subsystem and element of the vehicle 100 may be interconnected in a wired or wireless manner.

For example, the travel system 110 may include a component for providing power motion to the vehicle 100. In an embodiment, the travel system 110 may include an engine 111, a transmission apparatus 112, an energy source 113, and a wheel/tire 114.

The engine 111 may convert the energy source 113 into mechanical energy. The transmission apparatus 112 may transmit mechanical power from the engine 111 to the wheel 114. The energy source 113 is configured to provide energy for another system of the vehicle 100.

For example, the sensing system 120 may include several sensors configured to sense surrounding environment information of the vehicle 100. For example, the sensing system 120 may include a positioning system 121 (for example, a GPS system, a BeiDou system, or another positioning system), an inertial measurement unit (inertial measurement unit, IMU) 122, a radar 123, a laser rangefinder 124, and a camera 125. The sensing system 120 may further include a sensor (for example, an in-vehicle air quality monitor, a fuel gauge, and an oil temperature gauge) for monitoring an internal system of the vehicle 100. Sensor data from these sensors may be used to detect an object and its corresponding state (performance, position, shape, direction, speed, and the like). Such detection and recognition may be used by the vehicle 100 to determine a vehicle state that is indicated to a user, to ensure a safe operation of the user.

The control system 130 may be configured to control operations of the vehicle 100 and components of the vehicle 100. For example, the control system 130 may include a driver assistance system 134. The driver assistance system 134 may include an information assistant system and a control assistant system. The driver assistance system 134 may process and analyze sensor data obtained by the sensing system 120, and perform static and dynamic object and/or feature recognition based on the sensor data. The foregoing object and/or feature may include a traffic signal, a road boundary, and an obstacle, so that a possible situation or danger can be detected in advance, to assist a driver in convenient and safe driving.

In some embodiments, as shown in FIG. 1, the vehicle 100 may further interact with an external sensor, another vehicle, another computer system, or the user through the peripheral device 140. For example, the peripheral device 140 may include a vehicle-mounted computer 141, a microphone 142, a speaker 143, and the like. For example, the vehicle-mounted computer 141 may provide information for the user of the vehicle 100, and the vehicle-mounted computer 142 receives an input of the user through a user interface 170. In another case, the peripheral device 140 may provide a means for the vehicle 100 to communicate with another device in the vehicle. For example, the microphone 142 may receive audio (for example, a voice command or another audio input) from the user of the vehicle 100. Similarly, the speaker 143 may output audio to the user of the vehicle 100.

For example, some or all of functions of the vehicle 100 may be controlled by the computer system 150, where the computer system 150 may include at least one processor 151, and the processor 151 executes instructions 153 stored in, for example, a non-transient computer-readable medium in a memory 152. The computer system 150 may alternatively be a plurality of computing devices that control individual components or subsystems of the vehicle 100 in a distributed manner.

For example, the processor 151 may be any conventional processor, for example, a commercially available CPU.

In some embodiments, the processor may be a dedicated device, for example, an ASIC or another hardware-based processor. Although FIG. 1 functionally illustrates the processor, the memory, and other elements of a computer in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Therefore, it is understood that a reference to the processor or the computer includes a reference to a set of processors or computers or memories that may or may not operate in parallel. Different from using a single processor to perform the steps described herein, some components such as a steering component and a deceleration component each may include a processor. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 152 may include the instructions 153 (for example, program logic), and the instructions 153 may be executed by the processor 151 to perform various functions of the vehicle 100, including the functions described above. The memory 152 may also include additional instructions, including instructions to send data to, receive data from, interact with, and/or control one or more of the travel system 110, the sensing system 120, the control system 130, and the peripheral device 140.

For example, in addition to the instructions 153, the memory 152 may also store data, such as road maps, route information, locations, directions, and speeds of the vehicle, other such vehicle data, and other information. Such information may be used by the vehicle 100 and the computer system 150 during operation of the vehicle 100 in an autonomous mode, a semi-autonomous mode, and/or a manual mode.

In some embodiments, one or more of the foregoing components may be installed separately from or associated with the vehicle 100. For example, the memory 152 may exist partially or completely separate from the vehicle 100. The foregoing components may be communicatively coupled together in a wired and/or wireless manner.

In this embodiment of this disclosure, the computer system 150 may control the functions of the vehicle 100 based on inputs received from various subsystems (for example, the travel system 110, the sensing system 120, and the control system 130) and the user interface 170. For example, the computer system 150 may determine state information of the vehicle 100 based on inputs from the control system 130 and the sensing system 120, or the computer system 150 may further determine the state information of the vehicle 100 based on the data stored in the memory 152.

In this disclosure, the vehicle 100 may be a moving autonomous driving vehicle, and "autonomous driving" herein may be fully autonomous driving, or may be driver-assisted autonomous driving. A level of autonomous driving may be determined based on the society of automotive engineers (SAE) classification standard, and may be divided into an L0 level, an L1 level, an L2 level, an L3 level, an L4 level, and an L5 level. The L0 level is non-autonomous driving, and the driver operates the vehicle throughout a process completely. The L1 level is driving support, to be specific, the driver assistance system can control one of steering and deceleration based on judgment of the environment to provide driving support. L1-level autonomous driving has a driving assistance function, but operation of the driver is a main part. L2-level autonomous driving is a partial autonomous driving, to be specific, the driver assistance system may control steering, acceleration, and deceleration of the vehicle based on judgment of a surrounding environment, so that the driver can take a short rest. When the vehicle is in L2-level autonomous driving, the driver needs to pay attention to traffic conditions on the road and be ready to take over the vehicle at all time. L3-level autonomous driving is a condition-constrained autonomous driving, to be specific, the driver assistance system completes all driving operations under a condition, and the driver provides adaptive responses based on a system request. L4-level autonomous driving is highly autonomous driving, to be specific, the driver assistance system can complete all driving operations, and when driving on a conditional road, the driver can completely free the hands. L5-level autonomous driving is fully autonomous driving. This level of autonomous driving achieves a true sense of autonomous driving, and the driver can sleep in the vehicle, play games online, chat, and so on.

It can be learned from the foregoing that, for vehicles equipped with different levels of autonomous driving, prerequisites for operating the driver assistance system 134 and application scopes may also be different based on different levels of autonomous driving intelligence of the vehicles. The driver assistance system 134 can be guaranteed to operate normally only when corresponding conditions are met. Conversely, the driver assistance system 134 may be faulty if any one of prerequisites is not met.

For example, in autonomous driving with a high level of autonomous driving intelligence (for example, L3-level autonomous driving), the driver assistance system 134 may include a navigation cruise assistant (NCA) system. The NCA system can adapt to a complex road condition, and can automatically take an appropriate measure (for example, acceleration, deceleration, braking, and lane change) based on map information, to control the vehicle to reach a destination on a map. The NCA system can implement lateral and longitudinal motion control of the vehicle, and can select an appropriate lane based on a road condition to implement autonomous driving. In some cases, for example, when the vehicle moves out of a high definition map area or a navigation signal is lost, the NCA system automatically exits or degrades.

In autonomous driving with a lower level autonomous driving intelligence (for example, L2-level autonomous driving), the driver assistance system 134 may include an intelligent cruise assistance (ICA) system. The ICA system can implement lateral and longitudinal motion control of the vehicle by continuously controlling the engine 111, the transmission apparatus 112, a brake unit 132, or the like. By keeping a proper distance from a front vehicle and through lateral motion control within a lane line range, labor intensity of the driver is reduced, to ensure driving safety. In some cases, for example, when a lane line is blurred or the vehicle deviates from a current lane line, the ICA system can automatically exit or degrade.

In autonomous driving with a low degree of autonomous driving intelligence (for example, L1-level and L2-level autonomous driving), the driver assistance system 134 may further include an adaptive cruise control (ACC) system. The ACC system can implement longitudinal motion control of the vehicle. By keeping a proper distance from a front vehicle, driving assistance is implemented, and the vehicle usually has a predetermined vehicle speed range, for example, 65 km/h to 120 km/h. If a vehicle speed is out of the range (for example, the vehicle speed is less than 65 km/h or greater than 120 km/h), the ACC system automatically exits.

It should be understood that the NCA system, the ICA system, and the ACC system are merely examples for describing a driver assistance system that may be currently configured for the vehicle. Another driver assistance system may be further configured for the vehicle, to assist the driver in driving.

When the vehicle is in an inappropriate state (for example, some components in the foregoing description are faulty), or a use condition of the foregoing driver assistance system is not met, the driver assistance system 134 may actively or passively exit some functions. To ensure safe driving, current state information of the vehicle needs to be indicated to the user in a timely and clear manner. As an environment (including an environment of the vehicle and a surrounding environment) of the vehicle becomes complex, an effective solution for indicating vehicle state information is urgently needed, to feed back state information of the vehicle in driving to the user in a timely and clear manner.

In view of this, an embodiment of this disclosure provides a method for indicating vehicle state information. The following describes in detail the method provided in embodiments of this disclosure with reference to FIG. 2 to FIG. 5. The method may be performed by a controller. The controller may be a controller in the control system 130 or the computing system 150, or may be a chip, a circuit, a component, a system, or a mobile terminal disposed in a vehicle. This is not limited in this disclosure.

Figure 2:
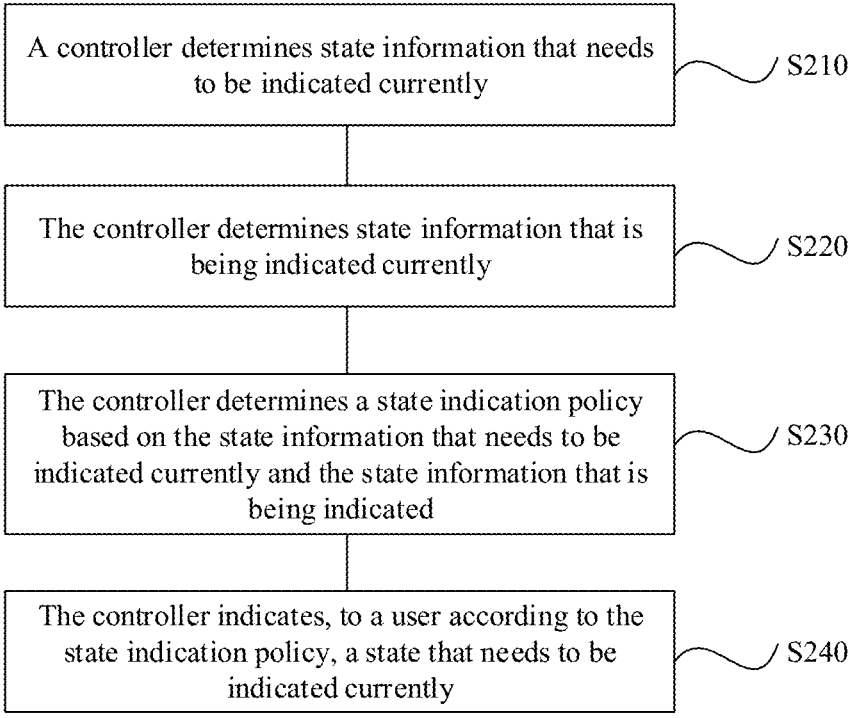
FIG. 2 is a schematic flowchart of a method for indicating vehicle state information according to an embodiment of this disclosure.

FIG. 2 is a schematic flowchart of a method for indicating vehicle state information according to this disclosure. As shown in FIG. 2, the method may include at least the following steps.

S210: A controller determines state information that needs to be indicated currently by a vehicle.

The state information that needs to be indicated currently may include at least one of the following information: a type of a state that needs to be indicated currently, and priority information of the state that needs to be indicated currently.

For example, the controller may obtain and determine, through another component in a vehicle, for example, a control system 150, the state information that needs to be indicated currently, or the controller may further determine, based on sensor data obtained from a sensing system 120, the state information that needs to be indicated currently.

The type of the state that needs to be indicated currently may include a timing state and a persistence state. The timing state may be understood as indicating the state information to a user in a time period. For example, indication duration may be 4 s. The persistence state may be understood as continuously indicating the state information to the user until the user makes a corresponding response. For example, when hands of a driver are detached from a steering wheel, a hand-off reminder may be indicated until the hands of the driver hold the steering wheel.

A priority of the timing state may be set in descending order based on an urgency degree of responding to the state by the user, for example, may be set to A1 to A4. A state corresponding to an A1 level may be an extremely dangerous state, and the user needs to immediately respond to the state. An A2-level state may be a dangerous state, and in this state, the vehicle may continue to travel, but the user needs to respond as soon as possible. An A3-level state may be an ordinary dangerous state, and when the state appears, the user may be notified to pay attention to the state, and does not need to process the state as soon as possible. An A4-level state may include a common notification state, that is, a state changes in this case, but the user only needs to know the state.

A vehicle in autonomous driving is used as an example. An A1-level state may include a fault-type state. The fault-type state may be a fault of a component and a driver assistance system in the vehicle, or exit of some driving assistance functions. For example, a state in which an ICA passively exit may be configured as the A1-level state.

The A2-level state may include passive degradation of some driving assistance functions. The passive degradation may be understood as degradation under a non-manual operation. For example, in a process of using driving assistance, if a condition to which NCA is applicable changes (for example, leaving a high definition map area), driving assistance may be passively degraded to ACC. The driving assistance function after passive degradation requires user assistance to coordinate a steering wheel or brake. Therefore, a passive degradation state of the driving assistance function may be set to an A2 level, that is, the vehicle may continue to travel, but the user needs to respond as soon as possible.

The A3-level state may include degradation or exit of some driving assistance functions. Degradation of the driving assistance function may include active degradation or passive degradation. Exit of the driving assistance function may include active exit. Active degradation or exit may be understood as degradation or exit determined by the controller based on a manual operation. For example, the controller may determine, based on a peripheral device 140 or a user interface 170, that the driving assistance function needs to actively degrade or exit. In some scenarios, if the controller determines that the driving assistance function after degradation is a driving assistance function that does not require a manual operation, the controller may determine a current state as an A3 level. For example, the driving assistance function degrades from an NCA cruise to an ICA cruise actively or passively; or if the controller determines that degradation or exit of the driving assistance function is an active operation, the controller may determine a current state as the A3 level.

An A4-level state indication may include an indication of a state of a current driving assistance function, for example, an indication indicating that NCA or ICA is available or unavailable, or NCA or ICA is in a standby, active, or on state.

It should be understood that the foregoing setting of a priority of a state of the vehicle in autonomous driving is merely an example, and more or fewer priorities may be set based on an actual requirement, and priorities corresponding to more states of the vehicle in autonomous driving may be separately set.

In some embodiments, the controller may further determine, based on a user behavior, state information that needs to be indicated currently. In some autonomous driving scenarios, the user needs to perform an assistant operation to assist autonomous driving. For example, during an ACC cruise, the user needs to assist in coordinating the steering wheel. In this case, if the controller determines that the user does not perform a corresponding operation, the controller may determine to indicate persistence state information to the user. In other words, the controller may continuously indicate the state information to the user until the user performs the corresponding operation.

In some embodiments, the controller may further determine priority information of the persistence state based on information about time when the user does not perform the corresponding operation.

In an example, if the controller determines that the time when the user does not perform the corresponding operation exceeds first preset duration, for example, the first preset duration is 1 minute, the controller determines that the persistence state is the A3 level, and the controller may indicate the persistence state to the user. If the controller determines that the time when the user does not perform the corresponding operation exceeds second preset duration, the controller determines that the persistence state is the A2 level. For example, the second preset duration may be preset duration after the controller indicates the A3-level persistence state to the user. In other words, if the user does not perform a response operation after the A3-level persistence state is indicated, and the time when the operation is not performed reaches the second preset duration, the A3-level persistence state is upgraded to the A2 level. If the controller determines that the time when the user does not perform the operation exceeds third preset duration, the controller determines to upgrade the persistence state to the A1 level. In other words, with accumulation of the time when the user does not perform the corresponding operation, a priority of the persistence state also increases.

For example, as shown in (a) in FIG. 3 to (c) in FIG. 3, during the ACC cruise, if the controller determines that time when both hands of the user are detached from the steering wheel exceeds 1 minute, the controller determines to indicate the A3-level persistence state to the user; and 1 minute after a first indication, if the controller determines that the user still does not hold the steering wheel, the controller determines to increase the priority of the persistence state to the A2 level. After 1 minute of indicating the A2-level persistence state information to the user, if the controller determines that the user still does not hold the steering wheel, the controller determines to increase the priority of the persistence state to the A1 level, and the state is continuously indicated until the user holds the steering wheel.

S220: The controller determines state information that is being indicated currently.

The state information that is being indicated currently may be information about a state that is determined by the controller last time and that needs to be indicated. For example, the controller may determine, through stored information about the state that needs to be indicated last time, the state information that is being indicated currently. The state information that is being indicated currently includes a type of a state that is being indicated currently and priority information of the state that is being indicated currently.

S230: The controller determines a state indication strategy based on the state information that needs to be indicated currently and the state information that is being indicated.

If the controller determines that the state that needs to be indicated currently is the persistence state, the controller determines to indicate the state that needs to be indicated currently after an indication of the state that is being indicated currently ends. In some embodiments, the controller may further determine priority information of the state that is being indicated currently. If the state that is being indicated currently is the A1 level, the controller may control not to process the state that needs to be indicated currently, as shown in a last row in Table 1.

It should be noted that the controller may determine that the state that needs to be indicated currently is the persistence state only when the state that is being indicated currently is the timing state. Because indication time of the persistence state is related to time of performing an operation by the user, if the persistence state is being indicated currently, the controller does not need to indicate a new persistence state.

If the controller determines that the state that needs to be indicated currently is the timing state, the controller determines, based on the priority information of the state that needs to be indicated currently and the state information that is being indicated currently, an indication strategy of the state that needs to be indicated currently. Based on different types of the state that is being indicated currently, there are two cases in which the controller determines the indication strategy of the state that needs to be indicated currently.

Case 1: The controller determines that the state that is being indicated currently is the timing state.

In this case, if the controller determines that a priority of the state that needs to be indicated currently is higher than a priority of the state that is being indicated, the controller determines to indicate the state that needs to be indicated currently to the user, and the controller determines that the state that needs to be indicated currently interrupts the state that is being indicated. For example, the controller may control a state pop-up window that needs to be indicated currently to interrupt a state pop-up window that is being indicated. As shown in Table 1, when the state that is being indicated currently is the timing state, the state that needs to be indicated currently is shown in an upper right corner of a diagonal.

If the controller determines that the priority of the state that needs to be indicated currently is the same as the priority of the state that is being indicated, the controller may determine, based on the priority information, whether to indicate the state that needs to be indicated. If the controller determines that the state that is being indicated currently is the A1-level state, and the state that needs to be indicated currently is also at the A1 level, the controller determines not to process the state that needs to be indicated. Generally, for the A1-level state, the user needs to immediately respond to the state. For example, the user needs to immediately take over the steering wheel, step on the brake, and the like. Therefore, if there is an A1-level state that is being indicated, the A1-level state does not need to be indicated again. If the controller determines that the state that is being indicated currently and the state that needs to be indicated currently are at the A2 level, the controller determines that the state that needs to be indicated interrupts an A2-level state that is being indicated; or if the controller determines that the state that is being indicated currently and the state that needs to be indicated currently are at the A3 level or A4 level, the controller determines to indicate the state that needs to be indicated after a first time period. The first time period may be greater than remaining display duration of an A3 or A4-level state that is being indicated. For example, the state that needs to be indicated may be indicated 0.5 second after an indication of a same-level state that is being indicated ends. The A3 or A4-level state does not need the user to respond as soon as possible, and therefore may wait in a queue until a previous indication ends and then be indicated. As shown in Table 1, when the state that is being indicated currently is the timing state, the state that is needs to be indicated currently is shown by the diagonal.

If the controller determines that the priority of the state that needs to be indicated currently is lower than the priority of the state that is being indicated, the controller may determine not to process the state that needs to be indicated. As shown in Table 1, when the state that is being indicated currently is the timing state, the state that needs to be indicated currently is shown in a lower left corner of the diagonal.

Case 2: The controller determines that the state that is being indicated currently is the persistence state.

In this case, if the controller determines that the priority of the state that needs to be indicated currently is at the A1 level, the controller determines that the state that needs to be indicated currently interrupts a persistence state that is being indicated currently; or if the controller determines that the state that needs to be indicated currently is at the A2 level to the A4 level, the controller determines to cover the persistence state that is being indicated currently. In other words, for a timing state with a high priority, the user needs to respond to the state immediately, and in this case, the persistence state does not need to be indicated to the user. For a timing state that the user does not need to respond as soon as possible, the timing state may cover the persistence state that is being indicated currently, and if the user does not perform an operation that needs to be performed by the persistence state after an indication of a timing state that needs to be indicated currently ends, the persistence state may continue to be indicated. The foregoing state indication policies are as shown in Table 1.

set below vehicle display of an autonomous driving area. In this way, the user can intuitively determine a current driving state of the vehicle without blocking other important driving information.

Figure 4:
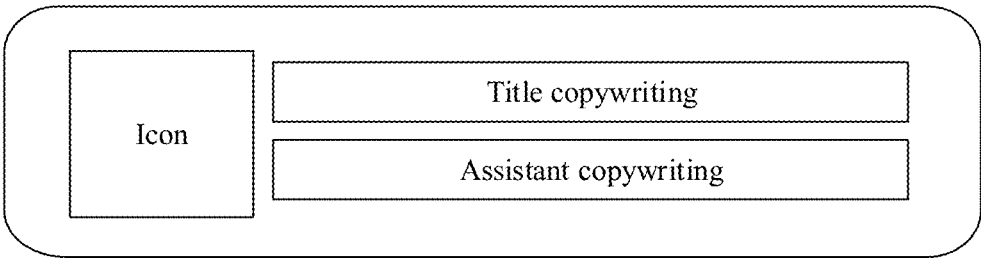
FIG. 4 is a schematic diagram of a format of a pop-up window for indicating vehicle state information according to an embodiment of this disclosure.

In an example, a pop-up window used for indicating the timing state may be configured to be in a style of a rounded rectangle, as shown in FIG. 4. In addition, different pop-up window colors may be set for states with different priorities. For example, a pop-up window of the A1-level state may be set to red, and a pop-up window of the A2-level state may be set to yellow.

Content displayed in the pop-up window may be arranged in a left-right layout. A visual icon related to a state is included on a left side, to quickly convey to the user. Copywriting related to the state may be included on a right side, to facilitate understanding of the user. As shown in FIG. 4, the copywriting on the right side may include a title copywriting and an assistant copywriting. In a general setting, the title copywriting may include a state description, and the assistant copywriting may include an action that needs to be performed by the user. For clarity, copywriting corresponding to the state description and the action that needs to be performed by the user may be displayed in different lines. For example, a first line may display the state, and the action that needs to be performed by the user is displayed in a different line. For example, in the A2-level state in which ICA passively degrades to ACC, a first line of the copywriting may display "Please hold the steering wheel", and a second line may display "Degradation to

TABLE 1

| State That Needs to Be Indicated | | State That Is Being Indicated (Persistence State: Timing State:) | | | |
|---|---|---|---|---|---|
| | | A1 | A2 | A3 | A4 |
| Timing State | A1 | Interruption<br>No processing | Interruption<br>Interruption | Interruption<br>Interruption | Interruption |
| | A2 | No processing<br>No processing | Coverage<br>Interruption | Coverage<br>Interruption | Interruption |
| | A3 | No processing<br>No processing | Coverage<br>No processing | Coverage<br>Waiting | Interruption |
| | A4 | No processing<br>No processing | Coverage<br>No processing | Coverage<br>No processing | Waiting |
| Persistence State | A3 | No processing | Waiting | Waiting | Waiting |

S240: The controller indicates, to the user according to the state indication strategy, the state that needs to be indicated currently.

According to the foregoing state indication strategy, the controller may determine whether to indicate the state that needs to be indicated currently to the user, or in which manner, for example, an interruption or a coverage manner, to indicate the state that needs to be indicated currently to the user.

If the controller determines to indicate a current state of the vehicle to the user, an indication form of the state may include a form of a pop-up window. For the timing state, the pop-up window can be set to be displayed for several seconds after being displayed. For example, stay duration may be set to 4 seconds. For the persistence state, the pop-up window may be set to be displayed continuously until the user performs the corresponding operation.

A specific form of the pop-up window may be configured in the controller. For timing states of different levels A1 to A4, pop-up windows of a same size and size may be set. In addition, a same display location may be set, for example, may be set below a middle part of a dashboard, or may be adaptive cruise has completed". In indications of states of some priorities, the title copywriting may also be a fault type, and the assistant copywriting is an action that needs to be performed, or the assistant copywriting may be a state, as shown in Table 2. For example, "System fault" and "Intelligent driving is temporarily unavailable" are displayed in two lines. In states of other priorities, the title copywriting and the assistant copywriting may be respectively a high-priority action and a next action. For example, "Please take over immediately" and "Close the door" are displayed in two lines. In indications of some states with low-priorities, only the title copywriting or the assistant copywriting may be indicated. For example, if ICA actively degrades to ACC, that "Degradation to adaptive cruise has completed" may be indicated.

TABLE 2

| | Category | Copywriting |
|---|---|---|
| Copywriting in a Pop-Up | Conventional | Title: Action<br>Appendix: State |

TABLE 2-continued

| | Category | Copywriting |
|---|---|---|
| Window | Special Case 1 | Title: Fault Type |
| | | Appendix: Action or State |
| | Special Case 2 | Title: High-Priority Action |
| | | Appendix: Next Step |

For quick understanding by the user, punctuation may not be used in the copywriting, and both the title copywriting and the assistant copywriting are complete statements. To further quickly and clearly convey the state to the user, a color halo may be disposed on top of a pop-up window of a high-priority state. For example, a red halo may be disposed on top of the pop-up window of the A1-level state for assistance. In addition, when a state in which the driving assistance function exits, in addition to a pop-up window, an animation effect of holding the steering wheel and stepping the brake may be displayed, to highlight an action that the user needs to take immediately.

The state of the vehicle in autonomous driving is used as an example. The state that needs to be indicated currently may include states shown in Table 3. The pop-up window may be classified into a conventional timing state pop-up window (Toast) and a take over request (TOR) pop-up window that requires the user to take over. A last column in Table 3 shows state indication copywriting of different levels.

TABLE 3

| Main Function | Sub-Function | Function Segmentation | Pop-up Window | Level | Copywriting |
|---|---|---|---|---|---|
| Fault Type | Driving assistance fault | Fault occurring during driving assistance | TOR | A1 | Please take over immediately Driving assistance function fault |
| Intelligent Cruise | ICA | Available | / | A4 | / |
| | | Standby (standby) 5 to 10 minutes | Toast | A4 | Please click a * button to restore an intelligent cruise system |
| | | Standby 10+ minutes | Toast | A4 | Waiting timed out Intelligent cruise assistance has exited |
| | | Active (active) | / | A4 | / |
| | | Passively exit | TOR | A1 | Please take over immediately Intelligent cruise assistance has exited |
| | | Actively exit | Toast | A3 | Intelligent cruise assistance has exited |
| | | Passively degrade to ACC | TOR | A2 | Please hold the steering wheel Degradation to adaptive cruise has completed |
| | | Actively degrade to ACC | / | A4 | Degradation to adaptive cruise has completed |
| | | Unavailable | / | A4 | / |
| | NCA | Available | / | A4 | / |
| | | Standby (standby) 5 to 10 minutes | Toast | A4 | Please click a * button Navigation cruise assistance has been restored |
| | | Standby 10+ minutes | Toast | A4 | Waiting timed out Navigation cruise assistance has exited |
| | | Active (active) | / | A4 | / |
| | | Actively degraded to ICA | Toast | A3 | Degradation to intelligent cruise assistance has completed |
| | | Passively degrade to ICA (Leave a high definition map area) | Toast | A3 | Leave a high definition map area Degradation to intelligent cruise assistance has completed |
| | | Passively degrade to ACC | TOR | A2 | Please hold the steering wheel Degradation to adaptive cruise has completed |
| | | Actively degrade to ACC | TOR | A3 | Degradation to adaptive cruise has completed |
| | | Passively exit | TOR | A1 | Please take over immediately Navigation cruise assistance has exited |
| | | Actively exit | Toast | A3 | Navigation cruise assistance has exited |

It should be understood that the state indication information of vehicle in autonomous driving in Table 3 is merely an example. State indication information of more states may be set for the vehicle in autonomous driving based on an actual requirement, and state indication copywriting corresponding to the state indication information may be separately set.

In some embodiments, an indication form of the state may further include a plurality of other forms or a combination of a plurality of forms. The plurality of forms may include at least one of the following: a sound effect, a text to speech (TTS) voice broadcast, head-up display (HUD), vibration, a light effect, and the like.

According to different levels of state information that is indicated, one of the foregoing state indication forms or a combination of a plurality of indication forms may be set. For example, a combination of a large quantity of state indication forms is set for state information with a high priority, and a small quantity of state indication forms is set for state information with a low priority, so that the user can clearly learn of current state information of the vehicle in a timely manner.

In an example, as shown in Table 4, a combination of a plurality of forms of the pop-up window, the sound effect, the TTS voice broadcast, a steering wheel vibration, and an atmosphere light may be set for the A1-level state, to clearly and intuitively indicate a current state with a highest priority of the vehicle to the user. A combination of the plurality of forms may also be set for indicating an A2 state. A combination of the pop-up window, the TTS, and the sound effect may be used in an A3-level state indication. For example, the TTS voice broadcast may be set to be used when a dangerous state, for example, function exit or degradation is indicated, or in some cases, an indication may be performed only in a form of the pop-up window and the sound effect. A combination of the pop-up window and the sound effect may be used in the A4-level state indication. Different colors may be set for display of the foregoing atmosphere light based on different state priorities, for example, the A1-level state is set to red, and the A2-level state is set to yellow. A sound effect material with different alert degrees and recognition degrees may be used for sound effect timbre setting based on different state priorities.

It should be understood that the foregoing combination indication forms of the pop-up window and other forms are merely examples. Different combination forms may be set for state information with different priorities based on an actual situation, to clearly indicate the current state information of the vehicle to the driver in a timely manner.

TABLE 4

| State Priority | Status Indication Form | | | |
| | TTS | Sound Effect | Steering Wheel Vibration | Atmosphere Light |
| --- | --- | --- | --- | --- |
| A1 | √ | √ | √ | √ (Red) |
| A2 | √ | √ | √ | √ (Yellow) |
| A3 | √ | √ | / | / |
| A4 | / | √ | / | / |

In a possible indication manner, the controller may further control a broadcast strategy of the state indication TTS to be detailed, concise, or sound-only. A detailed broadcast strategy may include a broadcast sound effect and all copywriting content in a pop-up window. A concise broadcast may be a sound effect and a part of copywriting, for example, only the broadcast sound effect and a first line of the copywriting. Moreover, when state indication TTS broadcast overlaps with other information broadcast in the vehicle, for example, navigation broadcast, music broadcast, and phone call, the controller may control the state indication TTS to first perform navigation broadcast; when the state indication TTS broadcast overlaps with the music broadcast, the controller may control the state indication TTS to broadcast in the concise broadcast strategy; and when the controller determines that state broadcast TTS overlaps with the phone call, the controller may control the state indication TTS to broadcast only a sound. In state indication with the sound effect, the controller may control that the sound effect and the pop-up window appear at the same time, and start to broadcast TTS after the sound effect ends.

Figure 5:
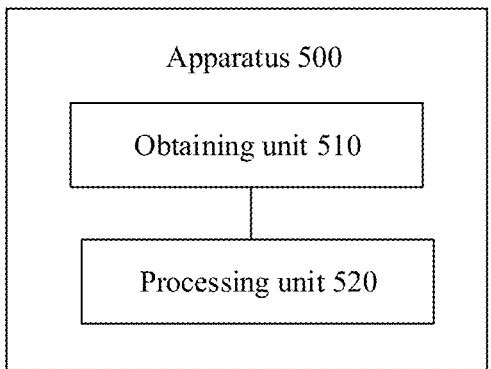
FIG. 5 is a schematic diagram of a structure of an apparatus according to an embodiment of this disclosure.
Figure 6:
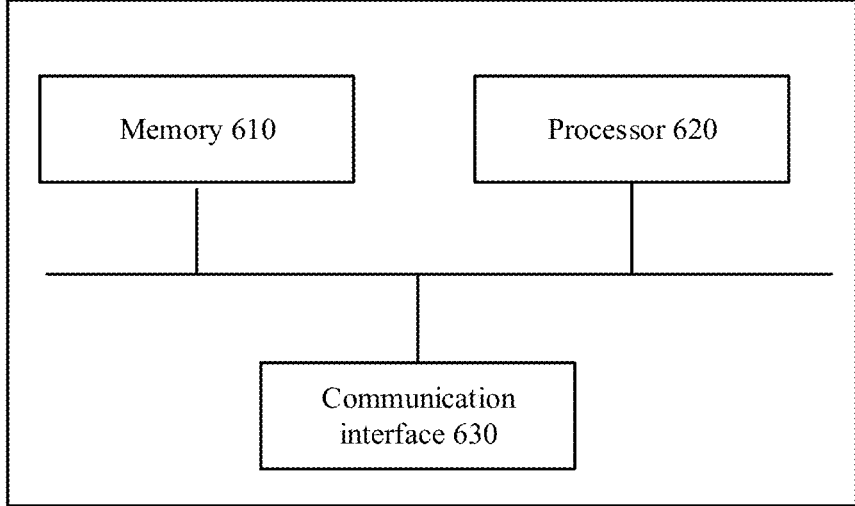
FIG. 6 is a schematic diagram of a structure of a controller according to an embodiment of this disclosure.
Figure 7:
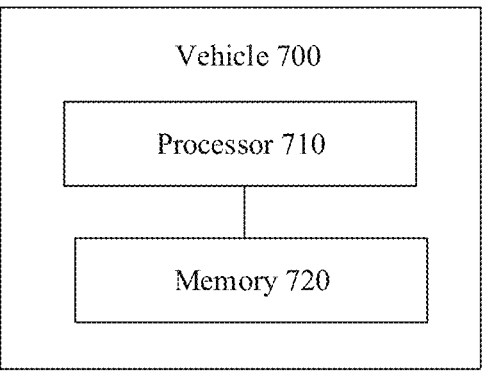
FIG. 7 is a schematic diagram of a structure of a vehicle according to an embodiment of this disclosure.

With reference to FIG. 2 and FIG. 4, the foregoing describes in detail the method for indicating vehicle state information provided in embodiments of this disclosure. With reference to FIG. 5 to FIG. 7, the following describes an apparatus for indicating vehicle state information provided in embodiments of this disclosure.

Refer to FIG. 5. FIG. 5 is a block diagram of a structure of an apparatus 500 for indicating vehicle state information according to this disclosure. As shown in FIG. 5, the apparatus 500 may include an obtaining unit 510 and a processing unit 520.

The obtaining unit 510 is configured to obtain state information of a vehicle.

The processing unit 520 is configured to determine, based on the state information of the vehicle, a strategy of indicating the state information to a user.

In some embodiments, the processing unit 520 may be configured to determine state information that needs to be indicated currently and state information that is being indicated currently, and determine, based on the state information that needs to be indicated currently and a state that is being indicated, the strategy of indicating the state information to the user.

For example, the obtaining unit 510 includes a sending unit or a receiving unit.

The sending unit is configured to indicate state information of the vehicle that needs to be indicated currently to the user. The receiving unit may be configured to receive an operation or instructions input by the user.

The apparatus 500 corresponds to an execution body of the foregoing method embodiment. The apparatus 500 may be the vehicle in the method embodiment, or a chip, a circuit, a component, a system, or a functional module in the vehicle in the method embodiment. Corresponding units of the apparatus 500 are configured to perform corresponding steps in the method embodiment shown in FIG. 2.

Only one or more of units in the apparatus 500 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC). The foregoing units may exist independently, or may be all or partially integrated.

FIG. 6 is a schematic block diagram of a controller according to an embodiment of this disclosure. The controller shown in FIG. 6 may include a memory 610, a processor 620, and a communication interface 630. The memory 610, the processor 620, and the communication interface 630 are connected through an internal connection path. The memory 610 is configured to store instructions. The processor 520 is configured to execute the instructions stored in the memory 620, to control the communication interface 630 to receive/send information. In some embodiments, the memory 610 may be coupled to the processor 620 through an interface, or may be integrated with the processor 620.

It should be noted that the communication interface 630 uses an apparatus, for example but not limited to an input/output interface, to implement communication between the controller and another device or a communication network.

In an implementation process, steps of the foregoing method may be performed by an integrated logic circuit of hardware in the processor 620 or by instructions in a software form. The method with reference to embodiments of this disclosure may be directly performed by a hardware processor, or may be performed through a combination of the hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 610. The processor 620 reads information from the memory 610 and performs the steps of the foregoing method through the hardware of the processor 620. To avoid repetition, details are not described herein again.

FIG. 7 is a schematic diagram of a structure of a vehicle 700 applicable to an embodiment of this disclosure. For ease of description, FIG. 7 shows only main components of the vehicle. As shown in FIG. 7, the vehicle 700 includes a processor 710 and a memory 720.

The memory 720 stores computer program instructions, and the processor 710 runs the computer program instructions to perform the method for indicating vehicle state information described in the method embodiment shown in FIG. 2.

This disclosure further provides a computer-readable storage medium. The computer-readable storage medium stores instructions, and when the instructions are run on a computer, a vehicle control apparatus is enabled to perform the steps in the method shown in FIG. 2.

This disclosure further provides a computer program product including instructions. When the computer program product runs on a computer, the vehicle control apparatus is enabled to perform the steps in the method shown in FIG. 2.

This disclosure further provides a chip including a processor. The processor is configured to: read and run a computer program stored in a memory, to perform a corresponding operation and/or procedure performed by a first vehicle in the vehicle control method provided in this disclosure. In some embodiments, the chip further includes the memory. The memory is connected to the processor through a circuit or a wire. The processor is configured to read and execute the computer program in the memory. Further, the chip further includes a communication interface, and the processor is connected to the communication interface. The communication interface is configured to receive processed data and/or information. The processor obtains the data and/or the information from the communication interface, and processes the data and/or the information. The communication interface may be an input/output interface, an interface circuit, an output circuit, an input circuit, a pin, a related circuit, or the like in the chip. The processor may alternatively be embodied as a processing circuit or a logic circuit.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for indicating vehicle state information, comprising:

obtaining, by a controller, state information that needs to be indicated currently and state information that is being indicated by a vehicle, wherein the state information comprises a state type and state priority information, wherein the state type comprises a persistence state, the persistence state is used to indicate to a user to perform a corresponding operation, and priority information of the persistence state is determined based on a time that the user starts to perform the corresponding operation; and determining, by the controller, a state indication strategy based on the state information that needs to be indicated currently and the state information that is being indicated, wherein the state indication strategy comprises a strategy of indicating the state information that needs to be indicated currently.

2. The method according to claim 1, wherein the state type further comprises a timing state, and the timing state comprises at least one of the following states:

a fault-type state, a state in which a driving assistance function partially or completely exits, a state in which the driving assistance function is actively or passively degraded, and a notification-type state.

3. The method according to claim 1, wherein the determining, by the controller, a state indication strategy based on the state information that needs to be indicated currently and the state information that is being indicated comprises:

determining, by the controller, that a state that needs to be indicated currently is the timing state, and a state that is being indicated currently comprises the timing state; and determining, by the controller, the state indication strategy based on priority information of the state that needs to be indicated currently and the state that is being indicated currently, wherein priority information of the timing state is determined based on an emergency degree of a corresponding operation that needs to be performed by the user.

4. The method according to claim 3, wherein the determining, by the controller, the state indication strategy based on priority information of the state that needs to be indicated currently and the state that is being indicated currently comprises:

based on the controller determining that a priority of the state that needs to be indicated currently is higher than a priority of the state that is being indicated currently, determining, by the controller, that the state that needs to be indicated currently interrupts the state that is being indicated currently; or based on the controller determining that a priority of the state that needs to be indicated currently is lower than a priority of the state that is being indicated currently, determining, by the controller, not to indicate the state that needs to be indicated currently.

5. The method according to claim 3, wherein the determining, by the controller, the state indication strategy based on priority information of the state that needs to be indicated currently and the state that is being indicated currently comprises:

based on a priority of the state that is being indicated currently being the same as a priority of the state that needs to be indicated currently, determining, by the controller, to interrupt the state that is being indicated currently; or determining, by the controller, to indicate, after a first time period, the state that needs to be indicated currently, wherein a duration of the first time period is not less than a remaining indication duration of the state that is being indicated.

6. The method according to claim 1, wherein the determining, by the controller, a state indication strategy based on the state information that needs to be indicated currently and the state information that is being indicated comprises:

determining, by the controller, that a state that needs to be indicated currently is the persistence state, and that a state that is being indicated currently is the timing state; and determining, by the controller, to indicate, after a first time period, the state that needs to be indicated currently, wherein a duration of the first time period is not less than a remaining indication duration of the state that is being indicated.

7. The method according to claim 1, wherein the determining, by the controller, a state indication strategy based on the state information that needs to be indicated currently and the state information that is being indicated comprises:

determining, by the controller, that a state that needs to be indicated currently is the timing state, and a state that is being indicated currently comprises the persistence state; and determining, by the controller, that the state that needs to be indicated currently interrupts or covers the state that is being indicated currently.

8. The method according to claim 1, wherein the method further comprises:

indicating, by the controller to the user according to the state indication strategy, the state that needs to be indicated currently.

9. The method according to claim 8, wherein the indicating, by the controller to the user according to the state indication strategy, the state that needs to be indicated currently comprises:

determining, by the controller, to indicate, to the user in a form of a pop-up window, the state that needs to be indicated currently, wherein a display location and a format of the pop-up window are fixed, the format of the pop-up window comprises an icon and copywriting that are separately arranged on different locations, the copywriting comprises state indication copywriting and copywriting of an action that needs to be performed, and the two types of copywriting are set in different lines.

10. The method according to claim 9, wherein the indicating, by the controller to the user according to the state indication strategy, the state that needs to be indicated currently further comprises:

determining, by the controller, to indicate, to the user in a form of a combination of the pop-up window and at least one of the following forms, the state that needs to be indicated currently:

a sound effect, a text-to-speech voice broadcast, a head-up display, a vibration, and alight effect.

11. A vehicle, comprising at least one processor; and
a memory coupled to the at least one processor and storing
   programming instructions for execution by the at least
   one processor, wherein upon execution by the at least
   one processor, the programming instructions instruct
   the at least one processor to perform the following
   operations:
obtaining, state information that needs to be indicated
   currently and state information that is being indicated
   by a vehicle, wherein the state information comprises a
   state type and state priority information, wherein the
   state type comprises a persistence state, the persistence
   state is used to indicate to a user to perform a corre-
   sponding operation, and priority information of the
   persistence state is determined based on a time that the
   user starts to perform the corresponding operation; and
determining a state indication strategy based on the state
   information that needs to be indicated currently and the
   state information that is being indicated, wherein the
   state indication strategy comprises a strategy of indi-
   cating the state information that needs to be indicated
   currently.
12. The vehicle according to claim 11, wherein the state
type further comprises a timing state, and the timing state
comprises at least one of the following states:
   a fault-type state, a state in which a driving assistance
      function partially or completely exits, a state in which
      the driving assistance function is actively or passively
      degraded, and a notification-type state.
13. The vehicle according to claim 11, wherein the
determining a state indication strategy based on the state
information that needs to be indicated currently and the state
information that is being indicated comprises:
   determining that a state that needs to be indicated cur-
      rently is the timing state, and a state that is being
      indicated currently comprises the timing state; and
   determining the state indication strategy based on priority
      information of the state that needs to be indicated
      currently and the state that is being indicated currently,
      wherein priority information of the timing state is
      determined based on an emergency degree of a corre-
      sponding operation that needs to be performed by the
      user.
14. The vehicle according to claim 13, wherein the
determining the state indication strategy based on priority
information of the state that needs to be indicated currently
and the state that is being indicated currently comprises:

based on determining that a priority of the state that needs
      to be indicated currently is higher than a priority of the
      state that is being indicated currently, determining that
      the state that needs to be indicated currently interrupts
      the state that is being indicated currently; or
   based on determining that a priority of the state that needs
      to be indicated currently is lower than a priority of the
      state that is being indicated currently, determining not
      to indicate the state that needs to be indicated currently.
15. The vehicle according to claim 13, wherein the
determining the state indication strategy based on priority
information of the state that needs to be indicated currently
and the state that is being indicated currently comprises:
   based on a priority of the state that is being indicated
      currently being the same as a priority of the state that
      needs to be indicated currently, determining to interrupt
      the state that is being indicated currently; or
   determining to indicate, after a first time period, the state
      that needs to be indicated currently, wherein a duration
      of the first time period is not less than a remaining
      indication duration of the state that is being indicated.
16. The vehicle according to claim 13, wherein the
determining a state indication strategy based on the state
information that needs to be indicated currently and the state
information that is being indicated comprises:
   determining that a state that needs to be indicated cur-
      rently is the persistence state, and that a state that is
      being indicated currently is the timing state; and
   determining to indicate, after a first time period, the state
      that needs to be indicated currently, wherein a duration
      of the first time period is not less than a remaining
      indication duration of the state that is being indicated.
17. The vehicle according to claim 11, wherein the
determining a state indication strategy based on the state
information that needs to be indicated currently and the state
information that is being indicated comprises:
   determining that a state that needs to be indicated cur-
      rently is the timing state, and a state that is being
      indicated currently comprises the persistence state; and
   determining that the state that needs to be indicated
      currently interrupts or covers the state that is being
      indicated currently.
18. The vehicle according to claim 11, wherein the
operations further comprise:
   indicating to the user according to the state indication
      strategy, the state that needs to be indicated currently.

* * * * *